Jan. 5, 1954  F. KOHN  2,664,661
FISHING APPARATUS
Filed July 15, 1946  3 Sheets-Sheet 1

Inventor
Frank Kohn
By
Mawhinney & Mawhinney
Attorneys

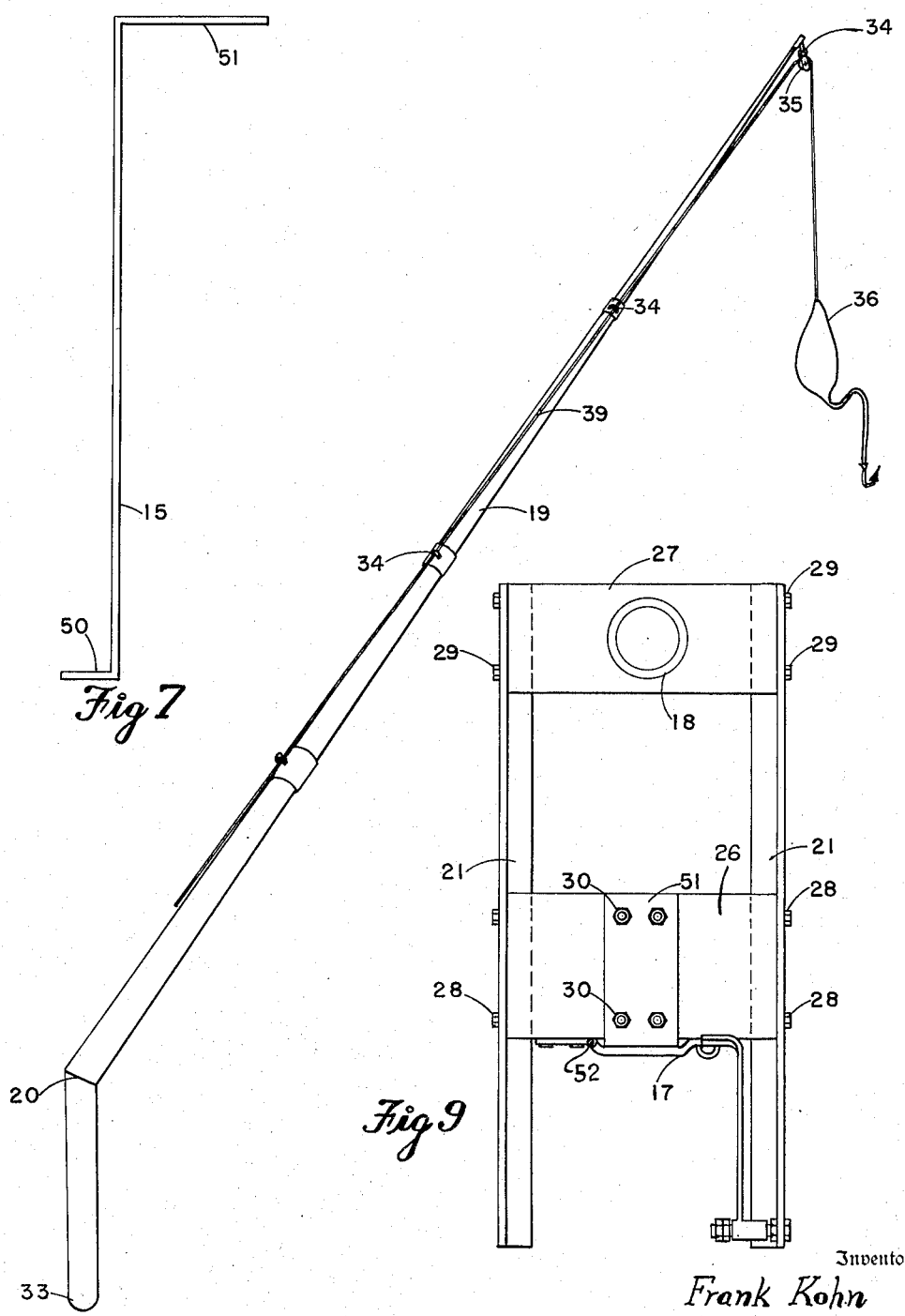

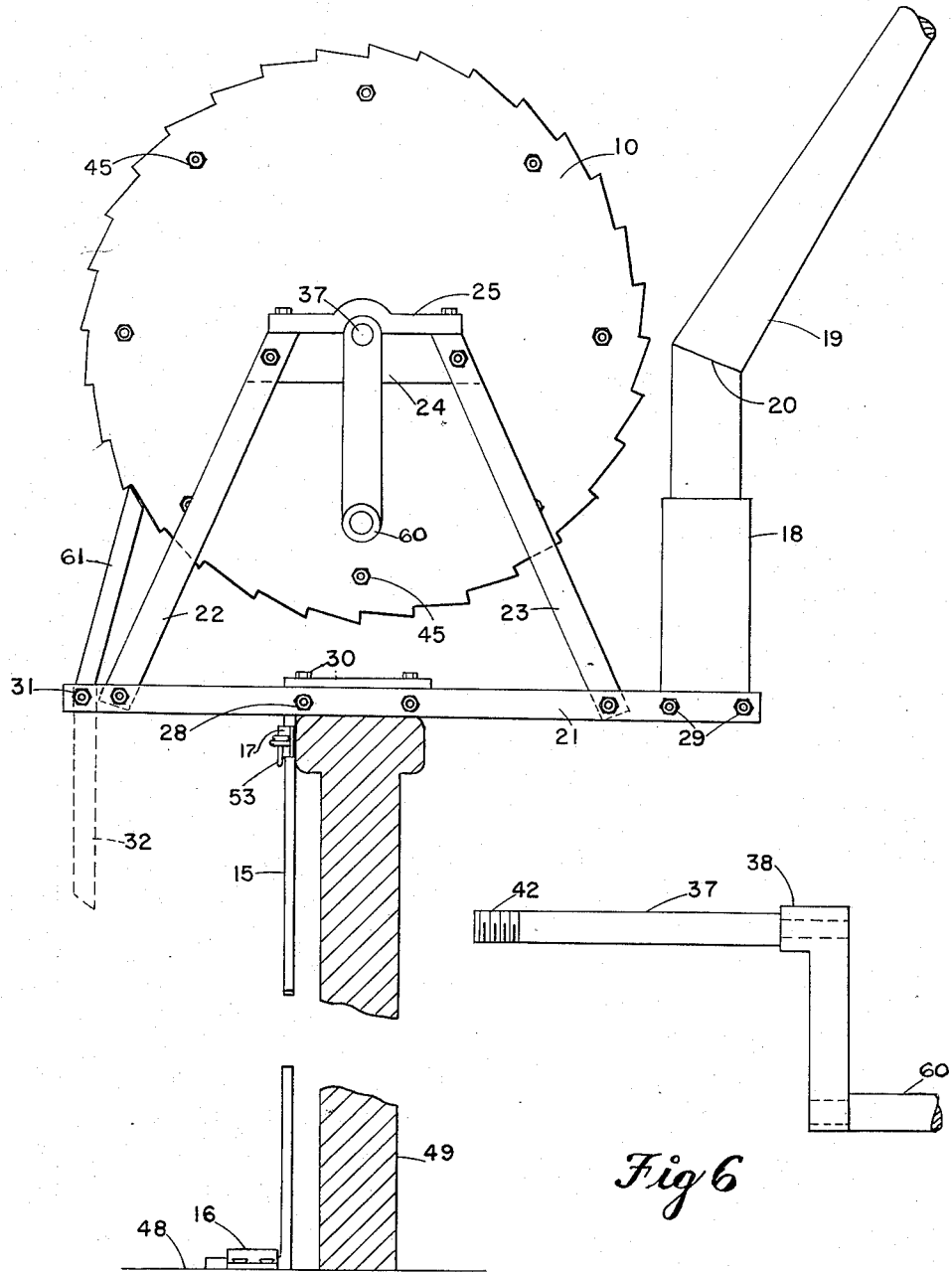

Patented Jan. 5, 1954

2,664,661

UNITED STATES PATENT OFFICE 2,664,661

FISHING APPARATUS

Frank Kohn, Mobile, Ala.

Application July 15, 1946, Serial No. 683,616

3 Claims. (Cl. 43—21.2)

The present invention relates to improvements in fishing apparatus and relates more particularly to apparatus dealing with fishing for deep sea fish such as snapper, warsaw, scamps, groupers and is adapted for use even with such large fish as haddock and cod.

The invention has for an object to provide an organization having a unitary reel of novel form in combination with a combined rod of a novel form and a rod socket in which the rod may swing inboard and outboard in a facile and ready manner.

It is another object of the invention to provide a fishing apparatus in which the parts are so constructed and arranged and so related to one another that they may be assembled in a short space of time but when not in use may be dismantled and packed in small compass for storage.

A further object of the invention resides in providing an improved fishing apparatus which is designed to handle safely and efficiently fish of heavy weights running into several hundred pounds and to take the weight and burden of fishing for such large fish in large measure off the fisherman.

The invention has for its further purpose to provide an improved reel having a free wheeling effect which permits safely lowering of the line, thus allowing for rapid handling of the tackle which is very important in this type of fishing.

It is a still further object of the invention to provide a ratchet arrangement in association with the reel to insure the catch which is important in the event of the hand slipping from the winding handle when the fish is being pulled in, in which emergency the pawl will hold the reel against retrograde rotation allowing the fisherman time and opportunity to again engage the winding handle of the reel; the ratchet being so arranged, however, that the pawl may be swung clear of the ratchet wheel to allow for free movement of the reel in both directions to either wind the line or pay out such line.

The invention has for its further object and purpose to provide a reel of such large diameter that one complete revolution of the same will easily equal the amount of line the fisherman could normally pull up in one manual movement, to the end with the apparatus, achieves such ease of movement on the part of the operator that the fisherman is able to accomplish much more fishing in the same amount of time because of decreased expenditure of energy per fish landed.

The invention has for its further purpose to eliminate the cause of the rough and calloused hands and the occasion for torn, bleeding or swollen hands with which all snapper fishermen now suffer.

With the foregoing and other objects in view the invention will be more fully described hereinafter and more particularly pointed out in the appended claims.

In the drawings, in which like parts are denoted by the same reference characters throughout the several views, Fig. 1 is an end elevational view of an improved fishing apparatus constructed in accordance with the present invention and illustrated as applied to the deck and rail of a ship;

Fig. 5 is a side elevational view, with a part of the rod broken away, showing the improved fishing apparatus on an enlarged scale as applied to the deck and rail of a ship shown in section;

Fig. 6 is a plan view of a form of reel crank handle employed;

Fig. 7 is an edge elevation of a form of brace rod employed;

Fig. 8 is a side elevational view of a form of fishing rod employed, and

Fig. 9 is a top plan view of the bottom frame with the reel and its supports removed.

Referring more particularly to the drawings, 10 designates a ratchet wheel which is formed as a part of one disc of the reel; such reel being completed by a plain disc wheel 11 which is spaced from the ratchet wheel 10 by spacing rods 12 distributed around the periphery of the reel and constituting an open reel construction for receiving the line which will constantly expose the line to the atmosphere for purposes of drying.

Figure 2:
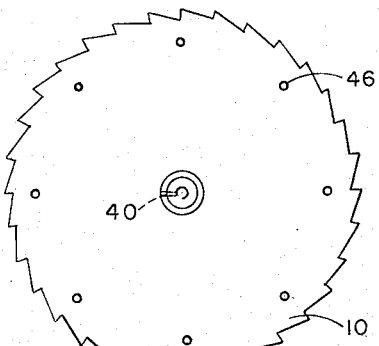
Fig. 2 is a plan view of a form of ratchet wheel employed.
Figure 3:
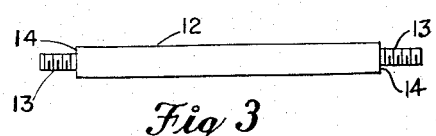
Fig. 3 is a plan view of a type of reel rod employed.
Figure 4:
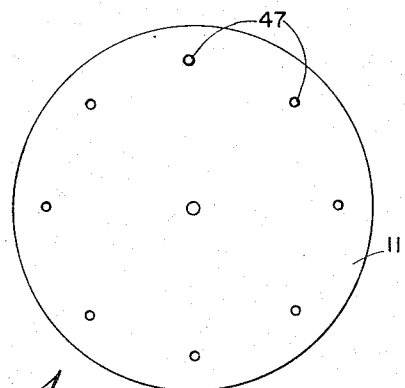
Fig. 4 is a plan view of the plain disc wheel of the reel.

As shown in Figs. 2, 3 and 4, the rods 12 are made with reduced ends 13 which produce shoulders 14 adapted to abut against the inner faces of the discs 10 and 11 when the rod reduced ends 13 are inserted snugly through the holes or perforations 46 and 47 made respectively in the discs 10 and 11. The reduced rod ends 13 are threaded on their exterior portions to receive nuts 45 by which the discs 10 and 11 are made fast to the rods 12.

The reel is rotated by means of a hand crank 60 and is held against the backward rotation by a pawl 61 which engages with the ratchet teeth of the disc 10.

The apparatus as a whole may be attached to the deck and rail of a ship or wharf by a brace bar 15 in connection with a hook 16 and clamp 17.

Referring more particularly to Fig. 7 the brace bar 15 is shown to have a right angularly turned foot 50 adapted to freely slide in and out of a hook 16 carried by the ship's deck 48 close to the rail 49. The upper end portion of the brace bar 15 is secured in an upright manner to the upper part of the rail 49 by means of the clamp 17 which may be a swinging hasp type of clamp pivoted at 52 and having a latch pin 53 for maintaining the same in place. The upper end of the brace bar 15 has a right angularly turned arm 51 extending in the opposite direction from the foot 50 and adapted to overlie a part of the frame of the fishing apparatus to which it is attached as hereinafter explained.

The fishing rod 19, preferably of steel, has an elbow 20 therein with a rounded lower end 33 fitting swivelly in an upright socket 18 carried by the frame of the apparatus. The fit of the rod in the socket 18 is such that the rod is easily turned from side to side, thus allowing the rod 19 to be swung in over the deck of the boat to unhook fish and alternately swung outboard in a position for fishing. The rod 19 will preferably be constructed of flexible steel or like material.

The socket 18 and the reel are both carried by a suitable framework which in the instance shown consists of horizontal spaced bars 21 which may be of angle iron or other appropriate construction. Extending transversely of the longitudinal bars 21 are the cross bars 26 and 27 secured to the bars 21 by detachable bolts and nuts 28 and 29. The socket 18 is carried by the cross bar 27 which may be arranged at the outboard end of the frame.

The brace bar 15 has its upper arm 51 overlying the cross bar 26 to which it is affixed as by bolts 30 or other suitable fastenings. The reel is carried upon the upright legs 22 which are bolted or otherwise affixed to the horizontal bars 21 and converge upwardly. These legs 22 may be made of angle iron or other appropriate material and are detachable by means of the bolts both from the horizontal bars 21 and from the reel axle holder. This reel axle holder comprises pairs of lower bearing blocks 24 and cap bearing blocks 25 which are bolted or otherwise secured to the upper end portions of the legs 22. These bearing blocks 24 and 25 and likewise the cross bars 26 and 27 are preferably not made of angle iron but of bar steel or the like.

The ratchet pawl 61 is pivoted as indicated at 31 to one of the longitudinal rails 21 and it may be swung to the inoperative dotted line position shown in Fig. 5 thus leaving the ratchet wheel and the reel free to rotate in either direction.

The pole 19 is equipped with the usual eyelets 34 and pulley 35 through which the fishing line 39 is run outwardly to the lead 36 and hook at the outer end of the line.

Figure 1:
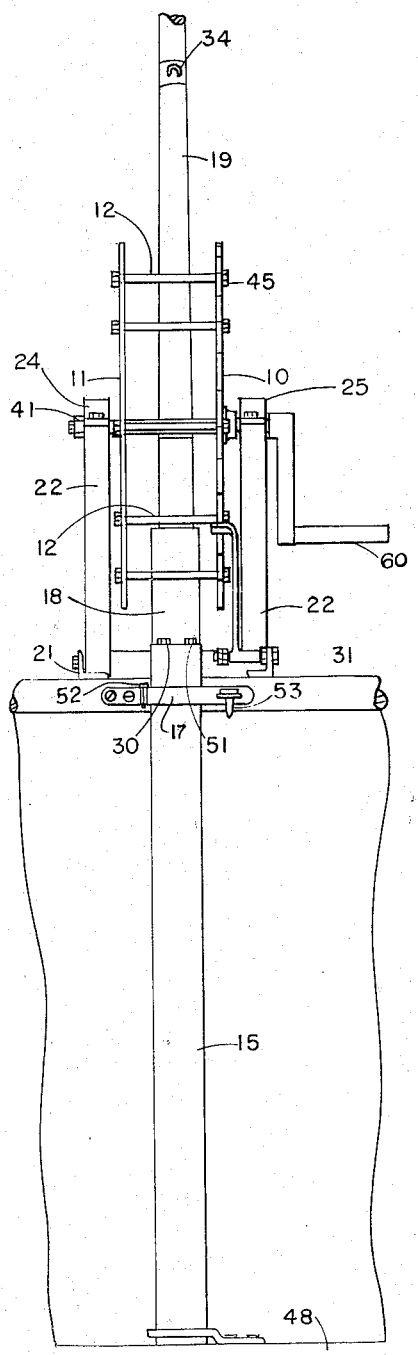

Referring more particularly to Fig. 6 the axle 37 of the reel which carries the crank handle 60 has a shoulder or boss 38 acting as a thrust member to abut against one of the bearing blocks 25 to reduce endwise or axial motion or play of the axle 37. This axle is threaded at 42 to receive the nut 41 shown in Fig. 1, such nut forming the other thrust member cooperating with the opposed bearing block 24.

It will be noted that all of the parts may be arranged for use with a uniformly sized nut all of which are interchangeable thus saving time in selecting particular nuts for specified parts and eliminating the necessity of a varied assortment of tools to assemble and disassemble the apparatus. In Fig. 2 a set screw 40 is shown by which the reel is affixed to its axle 37.

In the use of the device, the same is set up as noted in Figs. 4 and 5 by extending the frame of the device crosswise of the ship's rail 49, utilizing that rail as a support for the apparatus. A part of the fishing frame extends inboard and a part outboard with the cross bar 26 defining an intermediate portion of the frame as an indication to the fisherman to set the device upon the rail with its cross bar 26 extending above the same whereby the brace bar 15 will extend vertically downward substantially parallel with the rail 49 and unseat the same in a position so that its foot 50 may be readily inserted beneath the open hook 16 and its upper portion moved into the previously opened clamp 17. When the clamp is returned to place upon the brace bar 15 the entire fishing apparatus is locked securely in place in a favorable position for fishing at the same time taking up a minimum of space along the rail so that a ship may accommodate numerous of these devices all around the sides and stern thereof with a great many of the crew occupied simultaneously in fishing.

The fishing rod 19 is wholly supported by the socket 18 and by the rigid and strong frame of the apparatus so that the weighty fish will not become a burden to the fisherman and his entire attention may be occupied with the reel and with the paying out or reeling in of the fishing line 39. The pawl 61 will permit the rotation of the reel by the handle 60 in a clockwise direction as viewed from Fig. 5 which will be the winding in rotation of the reel. However, the pawl will prevent an anti-clockwise rotation such as would permit the paying out of the line as when a fish takes the hook and attempts to run. The fisherman, however, could release the pawl to the dotted line position of Fig. 5 thus freeing the reel in such eventuality.

In landing the fish the elbow or angular construction of the rod will form a species of davit by which when hoisted the fish may be swung inboard for easy landing and handling.

The device is readily set up for the fishing operations and is easily dismantled when returning from the fishing banks so as to clear the decks for other operations.

While I have disclosed herein the best form of the invention known to me at the present time I desire it to be understood that I reserve the right to make changes and modifications in the herein described embodiment of the invention provided such changes fall within the scope of the following claims.

I claim:

1. An apparatus for fishing for large weighty fish comprising a fishing rod having an offset integral lower butt portion, a vertical support for swivelly receiving the butt portion of said fishing rod to enable the same to be rotated in a vertical axis with the tip portion extending diagonally outwardly and upwardly therefrom, means for carrying said swivel support outboard of a boat, a huge reel, a reel support for the huge reel adjacent the rod support but carrying the reel independently of the rod and not subject to the swivel movement thereof, and means for controlling the line through the manipulations of the reel while independently rotating the rod to swing the same inboard and outboard of the boat.

2. An apparatus for fishing for large weighty fish comprising a support adapted to be horizontally mounted on the rail of a boat with a portion thereof extending inboard and outboard of the rail of said boat, a socket vertically mounted on the support and arranged perpendicular thereto on the outboard portion thereof, a fishing rod having an offset integral lower butt portion swivelly mounted in the socket for rotative movement about a vertical axis, the rod extending upwardly and outwardly from the butt end and having its tip end disposed high above the rail and at a substantially greater distance outboard of the rail than the socket butt end during the fishing operation, a huge reel, means mounting the reel on the support for rotation about a horizontal axis independent of the rod, the median plane of rotation of the reel being in line with the vertical axis of the butt of the rod and inboard of the same and the axis of the reel being above the butt end of the rod, said reel being adapted to support a line which passes to the fishing rod, and means for controlling the rotation of the reel independent of the rotary movement of the rod to swing the rod inboard and outboard of the boat.

3. The combination of claim 2, wherein means is provided for rigidifying the support on the rail of a boat and includes a brace bar, a member detachably mounting the brace bar on the deck of a ship in an upright manner and clamping means detachably affixing the upper end of the brace bar to the support.

FRANK KOHN.

References Cited in the file of this patent

UNITED STATES PATENTS

| Number | Name | Date |
|---|---|---|
| 202,962 | Robertson | Apr. 30, 1878 |
| 374,737 | Geils | Dec. 13, 1887 |
| 643,197 | McKinnon | Feb. 13, 1900 |
| 1,061,749 | Jennings | May 13, 1913 |
| 1,340,677 | Whitehead | May 18, 1920 |
| 1,464,623 | Lybeck | Aug. 14, 1923 |
| 1,945,446 | Madrak | Jan. 30, 1934 |
| 1,993,150 | Drake | Mar. 5, 1935 |
| 2,211,278 | Febvre | Aug. 13, 1940 |
| 2,315,628 | Lamond | Apr. 6, 1943 |

FOREIGN PATENTS

| Number | Country | Date |
|---|---|---|
| 844,423 | France | Apr. 17, 1939 |